Feb. 17, 1925.
H. M. YEAGER
RADIATOR MOUNTING
Filed April 6, 1923
1,526,946
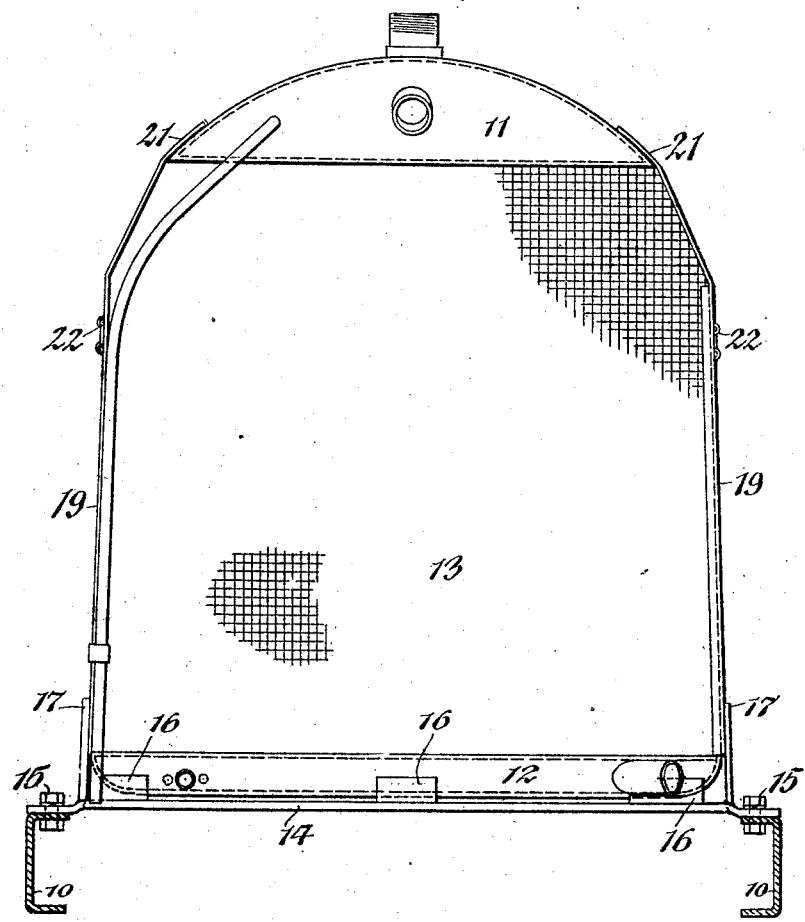
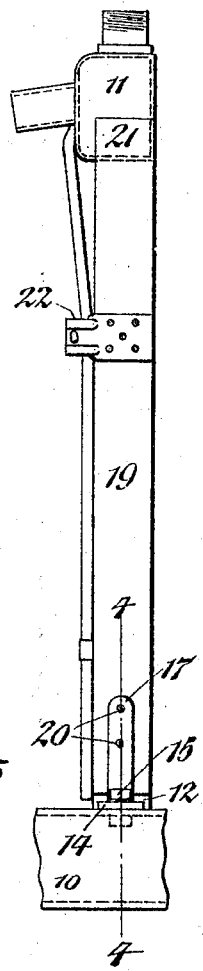
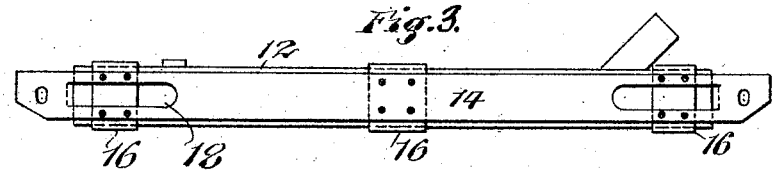
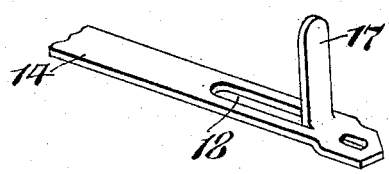
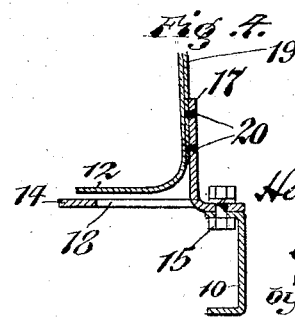

Patented Feb. 17, 1925.

1,526,946

UNITED STATES PATENT OFFICE.

HENRY M. YEAGER, OF BUFFALO, NEW YORK, ASSIGNOR TO FEDDERS MANUFACTURING COMPANY, INC., OF BUFFALO, NEW YORK, A CORPORATION OF NEW YORK.

RADIATOR MOUNTING.

Application filed April 6, 1923. Serial No. 630,351.

*To all whom it may concern:*

Be it known that I, HENRY M. YEAGER, a citizen of the United States, residing in Buffalo, in the county of Erie and State of New York, have invented new and useful Improvements in Radiator Mountings, of which the following is a specification.

This invention relates to a mounting for supporting a radiator on the frame of an automobile and it has for its object the production of such a mounting which is simple and durable in construction, which will reliably support the radiator on the automobile frame so as to save the same from racking strains which would be liable to cause the same to leak; and which also can be constructed at reduced cost and by the use of fewer parts.

In the accompanying drawings: Figure 1 is a rear elevation of my improved radiator mounting showing the same applied to a radiator and the frame of an automobile, which latter is shown in section. Figure 2 is a side elevation of the same. Figure 3 is a bottom plan view thereof. Figure 4 is a fragmentary vertical section taken on line 4—4, Fig. 2. Figure 5 is a fragmentary perspective view of the lower horizontal bar of the saddle and one of the coupling lugs formed thereon.

Similar characters of reference refer to like parts throughout the several views.

In the drawings 10, 10 represent the two longitudinal side bars or sills forming part of the main frame or chassis of the automobile. Between these side bars is arranged the radiator which is adapted to be mounted on the frame by means of my improved mounting, which radiator in the present instance, comprises an upper water inlet tank 11, a lower water outlet tank 12 and an intermediate core 13, which is provided with a plurality of upright water passages communicating with the upper and lower tanks and a plurality of horizontal air tubes through which the air passes for carrying away the heat of the water.

My improved radiator mounting for supporting the radiator on the automobile frame is constructed as follows:

14 represents a lower horizontal bar of metal which is adapted to rest at its opposite ends on the adjacent parts of the frame side bars 10 and to be detachably secured thereto by means of bolts 15 passing through holes 16 in the end portions of this bar. The underside or bottom of the lower tank 12 is arranged above the horizontal bar 14 and secured thereto by means of a plurality of clips 16, each of which is of substantially U-shaped form and secured with its web to the top of the lower bar 14, while the flanges of these clips are connected with the front and rear sides of the lower water tank 12, this connection of each of these clips with the bar 14 and the lower water tank being effected by spot welding or in any other suitable manner.

Adjacent to opposite ends of the lower supporting bar 14 the same is provided with two upwardly projecting coupling lugs 17, which are preferably formed thereon by striking up the central part of the metal from which this bar is made for a suitable distance, so as to form an opening 18 in this bar and leave the lower end of the lug 17 connected integrally with the bar at the outer end of the respective opening 18 which was formed by the removal of the metal constituting this lug, as best shown in Figs. 3, 4 and 5.

The lower part of the radiator is arranged between the coupling lugs 17 which latter are arranged close to the lower part of the upright edges of the radiator. The opposite upright edges of the radiator engage with the concave or channel sides of two upright supporting arms or bars 19 which are of U-shaped form in cross section to fit these parts of the radiator. The lower part of the web of each of these upright arms or bars is secured to the inner side of one of the coupling lugs 17 by means of spot welding 20, as shown in Fig. 4, or by other suitable means. At its upper end, the web of each of the upright arms is provided with an inwardly and upwardly projecting lip or flange 21 which is attached to the upper side or top of the upper tank by means of spot welding or other suitable means for the purpose of confining the radiator within the saddle formed by the lower horizontal bar 14, the upright arms 19 and the parts associated therewith. On the outer sides of the upper parts of the upright arms 19, the same are provided with rearwardly projecting clips 22 which are connected with these arms by means of electric welding or the like, and which are adapted to be secured at their rear ends with the usual casing of the radiator for the purpose of holding the latter in place relatively to the radiator and its mounting.

By extending the lower bar 14 of the saddle laterally beyond the radiator so that the same can bear directly on the upper side of the main frame and providing this bar with integral up-turned lugs 17 to which the upright arms 19 of the saddle are secured, a support for the radiator is provided on the frame which permits of carrying the weight of the radiator directly on the side bars of the frame and avoids the necessity of having a special cross bar on the frame for this purpose. It is thus possible to mount the radiator on the chassis of an automobile regardless of whether or not the same has a cross bar in the proper place.

It will therefore be apparent that by the use of this improved mounting the radiator may be properly supported upon the frame regardless of any particular design of the frame so long as it has two longitudinal side bars or sills.

Owing to the formation of the coupling lugs 17 in one piece with the supporting bar 14, the construction of the saddle is very much simplified and the cost of the same reduced aside from the fact that a much more durable and stronger construction is obtained by reason of this organization.

I claim as my invention:

1. A radiator mounting comprising a lower horizontal bar adapted to support the radiator on its underside and adapted to be connected at its opposite ends with the frame of an automobile and provided adjacent to its ends with upwardly turned lugs arranged adjacent to opposite upright edges of said radiator, said lugs being formed integrally by striking the same upwardly out of the central part of the metal constituting said bar and leaving part of the metal of the latter on opposite sides of said lugs.

2. A radiator mounting comprising a lower horizontal bar adapted to support the radiator on its underside and adapted to be connected at its opposite ends with the frame of an automobile and provided adjacent to its ends with upwardly turned lugs arranged adjacent to opposite upright edges of said radiator, said lugs being formed integrally by striking the same upwardly out of the central part of the metal constituting said bar and leaving part of the metal of the latter on opposite sides of said lugs, and upright bars adapted to be arranged on opposite sides of said radiator and to be connected therewith and each having its lower end connected with one of said lugs.

HENRY M. YEAGER.